United States Patent
Smith et al.

(10) Patent No.: US 10,248,363 B2
(45) Date of Patent: Apr. 2, 2019

(54) ACCESSORY MODULES

(71) Applicant: Hewlett-Packard Development Company, L.P., Houston, TX (US)

(72) Inventors: Kenneth K Smith, Boise, ID (US); Daniel Collingwood, Meridian, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 41 days.

(21) Appl. No.: 15/118,193

(22) PCT Filed: Feb. 13, 2014

(86) PCT No.: PCT/US2014/016217
§ 371 (c)(1),
(2) Date: Aug. 11, 2016

(87) PCT Pub. No.: WO2015/122893
PCT Pub. Date: Aug. 20, 2015

(65) Prior Publication Data
US 2017/0168760 A1    Jun. 15, 2017

(51) Int. Cl.
*G06F 3/12* (2006.01)

(52) U.S. Cl.
CPC .......... *G06F 3/1209* (2013.01); *G06F 3/123* (2013.01); *G06F 3/1236* (2013.01); *G06F 3/1285* (2013.01)

(58) Field of Classification Search
None
See application file for complete search history.

(56) References Cited

U.S. PATENT DOCUMENTS

| | | | |
|---|---|---|---|
| 7,576,883 B2 | 8/2009 | Ragnet et al. | |
| 8,570,566 B2 | 10/2013 | St. Laurent et al. | |
| 9,141,483 B1 * | 9/2015 | Sekar | G06F 11/1662 |
| 2003/0038963 A1 | 2/2003 | Yamaguchi | |
| 2004/0223180 A1 | 11/2004 | Brooks | |
| 2004/0246913 A1 | 12/2004 | Gassho et al. | |
| 2005/0068571 A1 | 3/2005 | Hart et al. | |
| 2012/0246553 A1 | 9/2012 | Ong | |
| 2013/0268666 A1 | 10/2013 | Wilson et al. | |
| 2013/0281020 A1 | 10/2013 | Montemurro | |

FOREIGN PATENT DOCUMENTS

WO    WO-2012117220    9/2012

OTHER PUBLICATIONS

Amped Wireless, "Setup Guide," AP300EX, 2011, 2 pages <http://www.ampedwireless.com/datasheets/support/AP300_SetupGuide_LR.pdf>.

Cisco, "IP Redirect Application Note," Cisco Aironet 1100 Series, 2005, 4 pages <http://www.cisco.com/en/US/docs/wireless/technology/ip-redirect/>.

Hindle, A., Swarmed: Captive Portals, Mobile Devices, and Audience Participation in Multi-user Music Performance, (Research Paper). May 27-30, 2013—6 pages.

(Continued)

*Primary Examiner* — Lennin R Rodriguezgonzalez
(74) *Attorney, Agent, or Firm* — Trop Pruner & Hu PC

(57) ABSTRACT

An accessory module to receive a request for a web resource from a client device. In response to the request, the accessory module may redirect the client device to at least one setup webpage, different from the web resource, for configuration of the accessory module.

16 Claims, 3 Drawing Sheets

(56) References Cited

OTHER PUBLICATIONS

Justin Phelps, "How to Set Up a Wireless Router," PCWorld, Feb. 11, 2012, 3 pages.
Nest, "A step-by-step guide to setup on the Nest Learning Thermostat," Nest Support, Dec. 9, 2013, <http://support.nest.com/article/—6 pages.
Novatel Wireless, User Guide. Verizon. 4620L—2012—101 pages.
Verizon. Activation Guide for your prepaid Verizon Jetpack. No Date—6 pages.
Verizon. User Guide. MiFi 551OL—2013—96 pages.
Wikipedia, "Captive Portal," Dec. 21, 2013, <http://en.wikipedia.org/wiki/Captive_portal>. 4 pages.
International Search Report & Written Opinion received in PCT Application No. PCT/US2014/016217, dated Nov. 12, 2014, 15 pages.

* cited by examiner

ACCESSORY MODULES

BACKGROUND

A target device, such as a printer, can have a wireless capability to enable wireless interaction with the target device. For example, if a printer has a wireless capability, a client device can send print requests over a wireless connection to the printer, to perform printing at the printer. However, if a target device does not have a wireless capability, then a client device may be connected over a wired connection to the target device to allow the client device to access the target device.

BRIEF DESCRIPTION OF THE DRAWINGS

Some implementations are described with respect to the following figures.

DETAILED DESCRIPTION

Figure 1:
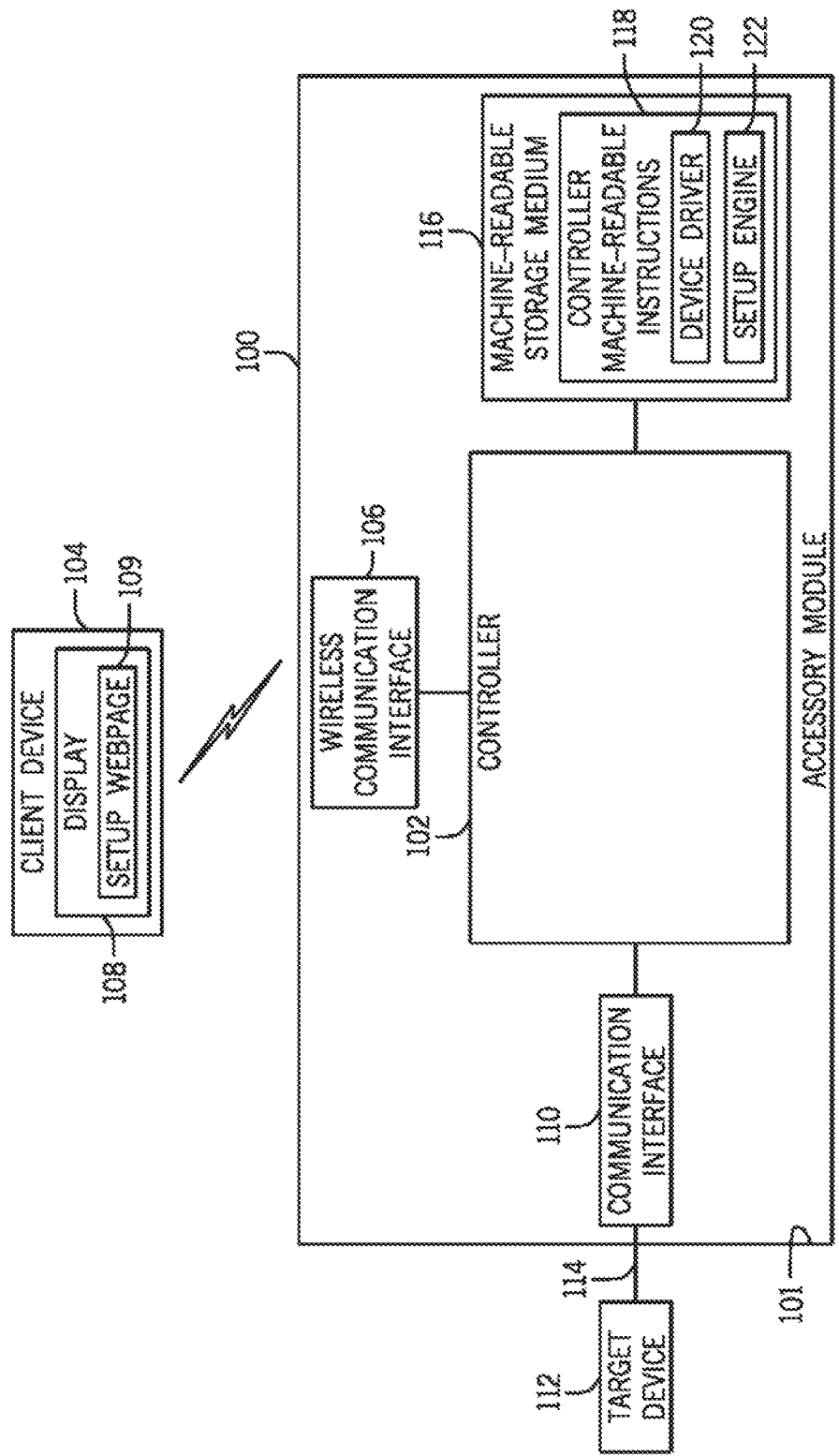
FIGS. 1 and 3 are block diagrams of example arrangements that include an accessory module according to various implementations.

Examples of target devices that are accessible by client devices include one or some combination of the following: a printer (including, e.g., a multifunction printer (MFP), or any other type of printer), a scanner, a thermostat (for controlling an air conditioning and/or heating system), an appliance, a vehicle, or any other device that is capable of performing a task in response to a request from a client device. A client device can refer to any type of electronic device, such as a desktop computer, a notebook computer, a tablet computer, a smartphone, a game appliance, a set top box, and so forth.

Traditionally, if a target device does not include a wireless communication interface, then a client device may be connected over a wired connection to the target device to allow the client device to interact with the target device. This reduces user convenience since a user may not have a cable readily available to allow the user to connect the client device to the target device.

In accordance with some implementations, an accessory module with a wireless communication capability can be connected to a target device that is without a wireless communication interface. Once the accessory module is connected to the target device, a client device can wirelessly interact with the target device.

The accessory module is separate from the target device and the client device. The wireless communication capability of the accessory module allows the accessory module to act as a wireless access point such that the client device may wirelessly connect to it. The accessory module further includes support logic to support processing of requests by client devices to perform tasks at the target device. The support logic can include a device driver for the target device, where the device driver operates or controls the target device.

An issue associated with use of an accessory module is that the accessory module may not have a user interface to allow for easy configuration of the accessory module. For example, the accessory module may be relatively small in size, and may include just one or a few buttons and one or a few visual indicators, such as visual indicators including light emitting diodes (LEDs) or other types of visual indicators.

An accessory module according to some implementations includes an embedded web server that can provide at least one setup webpage to a client device to allow for convenient configuration of the accessory module based on input in the at least one setup webpage that is displayed at the client device. A web server can refer to a logical entity (implemented with machine-readable instructions) that provides content to a requesting device, such as in HyperText Transfer Protocol (HTTP) message(s) or in message(s) according to another protocol. An embedded web server can refer to a server that is included as a logical part of the accessory module. In the present disclosure, the content provided by the embedded web server is at least one setup page, which can include HTTP data or data according to another protocol. The setup page (hereinafter referred to as a "setup webpage") can be used for configuring the accessory module.

As shown in FIG. 1, an accessory module 100 includes a controller 102 that is able to implement an embedded web server according to some implementations. In some examples, the controller 102 can be a microprocessor, a microcontroller, an application-specific integrated circuit (ASIC) device, a field programmable gate array (FPGA), or any other processing circuit that is able to perform specified tasks. The embedded web server can be implemented as machine-readable instructions, such as part of controller machine-readable instructions 118.

A client device 104 is able to communicate wirelessly with the accessory module 100 through a wireless communication interface 106 of the accessory module 100. In some examples, the wireless communication can be according to the IEEE 802.11 wireless communications protocol, a near-field communication (NFC) protocol, or another wireless protocol. As shown in FIG. 1, a setup webpage 109 provided to client device 104 by the controller 102 via the wireless communication interface 106 can be displayed in a display 108 of the client device 104. The setup webpage 109 can be displayed in a user interface screen of a web browser that is displayed in the display 108 for example.

Using the setup webpage displayed at the client device 104, a user or programmatic process at the client device 104 can configure the accessory module 100. Configuring the accessory module 100 can refer to an adjustment of one or multiple settings of the accessory module 100 that affect an operation of the accessory module 100. Examples of settings that can be adjusted using at least one setup webpage displayed at the client device 104 include: a language setting (to select a language to be used in a user interface provided by the accessory module 100), an automatic update setting (to control whether or not machine-readable instructions, such as firmware and/or software, of the accessory module 100 are automatically updated), a wireless network setting (to control whether or not the accessory module 100 is to connect to an available wireless network that is within a range of the accessory module 100, by indicating the appropriate service set identification (SSID and passphrase, for example)), a setting relating to a user credential (e.g. a username, a password, etc.) used for authorizing access of the accessory module 100, and/or other settings.

By being able to serve at least one setup webpage for display at the client device 104 to allow for configuration of the accessory module 100, the accessory module 100 can be provided with a simple user interface, such that the design of the accessory module 100 can be made simple for reduced cost of the accessory module while maintaining full functionality.

Although just one client device 104 is shown in FIG. 1, multiple client devices can connect to the accessory module 100. In some examples, a first client device is used for configuring the accessory module by using the at least one setup webpage 109 provided by the accessory module 100. This first client device can be a client device of an administrator or other user. Once the accessory module 100 is configured using the at least one setup webpage 109, the accessory module 100 can be accessed by any client device, without having to perform any further configuration of the accessory module 100, unless specifically requested by a user.

As further shown in FIG. 1, the accessory module 100 includes a communication interface 110 to communicate with a target device 112 (or multiple target devices). A link 114 between the target device 112 and the communication interface 110 can be a wired link, such as an electrical cable, an optical cable, and so forth. In other examples, the link 114 between the target device 112 and the communication interface 110 can be a wireless link.

In a specific example, the target device 112 is a printer that is without a wireless capability. As a result, a client device, such as the client device 104 or another client device, would not be able to wirelessly interact with the printer to perform printing at the printer. However, by connecting the printer to the accessory module 100, a client device can interact with the accessory module 100 to perform printing at the printer.

In other examples, the target device 112 can be another type of device, such as a thermostat, a scanner, an appliance, a vehicle, and so forth.

The accessory module 100 also includes a machine-readable storage medium 116, which can store controller machine-readable instructions 118 that can be loaded and executed by the controller 102 to implement the functionalities of controller 102 described herein. Although the storage medium 116 is shown as being external of the controller 102, it is noted that in other examples, the storage medium 116 can be embedded within the controller 102. In further examples, the controller machine-readable instructions 118 can be stored in an embedded storage medium of the controller 102, while other information is stored in the storage medium 116 that is external of the controller 102. In other examples, any of the functionalities described herein in relation to controller 102 can be hard-coded as circuitry in the controller 102.

The controller machine-readable instructions 118 include a device driver 120 that is used for operating or controlling the target device 112. When executed on the controller 102, the device driver 120 can receive, from a client device, a request for performing a task at the target device 112. In response to such request, the device driver 120 can issue respective one or multiple commands to the target device 112 for performing the task at the target device 112. For example, if the target device 112 is a printer, then the request received from the client device by the device driver 120 can be a print request. The device driver 120 can issue one or multiple print commands corresponding to the print request to the printer connected to the accessory module 100.

The controller machine-readable instructions 118 also include a setup engine 122, which when executed by the controller 102, can perform a setup procedure to configure the accessory module 100. The setup engine 122 when executed by the controller 102 can perform configuration of the accessory module 100 in response to input received at the at least one setup webpage 109 displayed at the client device 104. Configuring the accessory module 100 can refer to an adjustment of one or multiple settings of the accessory module 100 that affect an operation of the accessory module 100, such as those discussed further above. The settings can be stored in a storage medium of the accessory module 100.

Although the foregoing refers to implementations in which the device driver 120 and setup engine 122 are machine-readable instructions that are executable on the controller 102, it is noted that in other examples, the device driver 120 and/or the setup engine 122 can be implemented in hardware. For example, the device driver 120 and/or setup engine 122 can be hard-coded as circuitry in the controller 102.

The controller 102, wireless communication interface 106, communication interface 110, and storage medium 116 of FIG. 1 are contained within an external housing 101 of the accessory module 100.

Figure 2:
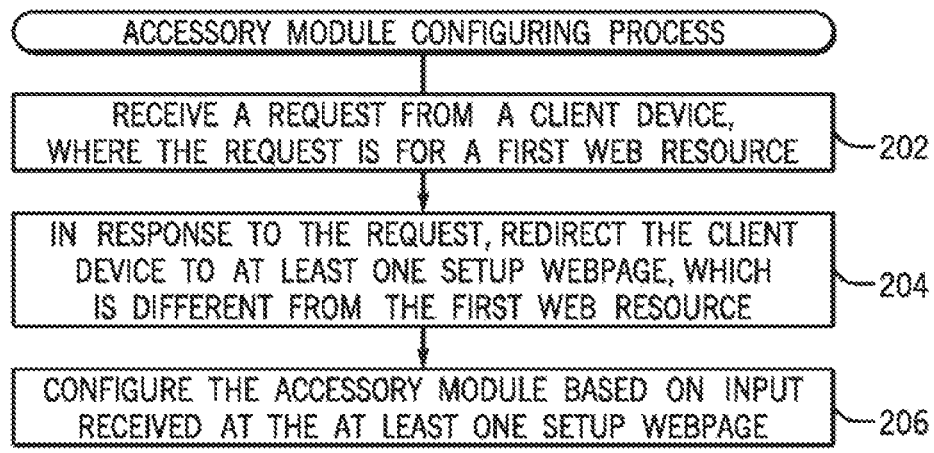
FIG. 2 is a flow diagram of an example process of configuring an accessory module according to some implementations.

FIG. 2 is a flow diagram of an example configuration process that is performed by the accessory module 100 according to some implementations. In some examples, the configuration process may begin when the accessory module 100 has not yet been configured. The accessory module 100 receives (at 202) a request from the client device 104, where the request is for a first web resource. The first web resource is located at a location (e.g. website or other entity accessible over a network, such as the Internet) that is remote from the accessory module 100. The first web resource can be a webpage or any other resource (e.g. data, program, etc.) accessible over a network. The first web resource can be identified by an address, which can be in the form of a uniform resource locator (URL), an Internet Protocol (IP) address, or some other type of address.

In response to the request, the accessory module 100 redirects (at 204) the client device 104 to at least one setup webpage (e.g. 109 in FIG. 1), which is different from the first web resource. Redirecting the client device 104 to the at least one setup webpage causes the client device 104 to retrieve the at least one setup webpage from the accessory module 100, and to display the retrieved at, least one setup webpage at the client device. The at least one setup webpage can be used for configuring the accessory module 100.

The redirection that is performed by the accessory module 100 can use a captive portal. A captive portal, which is implemented by the controller 102 when executing the controller machine-readable instructions 118, can block packets (e.g. IP packets) destined to a destination outside the accessory module 100. The captive portal can capture certain requests from the client device 104, such as HTTP requests. The captive portal can then redirect the client device 104 to use a specified webpage (e.g. the setup webpage discussed above) before the client device can access a requested web resource.

The accessory module 100 is configured (at 206) based on input received at the at least one setup webpage. The input is received based on user selections and/or entries (of text or other information) made in the at least one setup webpage. As noted above, settings that are set by the configuring can be stored in a storage medium of the accessory module 100 for use by the accessory module during operation.

The request received at 202 can be received using the wireless communication interface 106. Once configured, the accessory module 100 can receive requests to perform tasks at a target device (e.g. 112 in FIG. 1) from client devices. These latter requests can also be received using the wireless communication interface 106 of the accessory module 100.

A wireless connection between a client device and the accessory module 100 can be a peer-to-peer wireless connection. A peer-to-peer connection is a direct connection between the client device and the accessory module 100 (in other words, the peer-to-peer connection does not pass through a router or other access point). Alternatively, a wireless connection between a client device and the accessory module 100 can be over a wireless network that is provided by a wireless access point that is separate from the accessory module 100. A wireless access point can include a wireless router or any other type of device that is able to wirelessly communicate with other devices within a range of the wireless access point. A client device can use the wireless network provided by the wireless access point to access a resource, including the accessory module 100.

Figure 3:
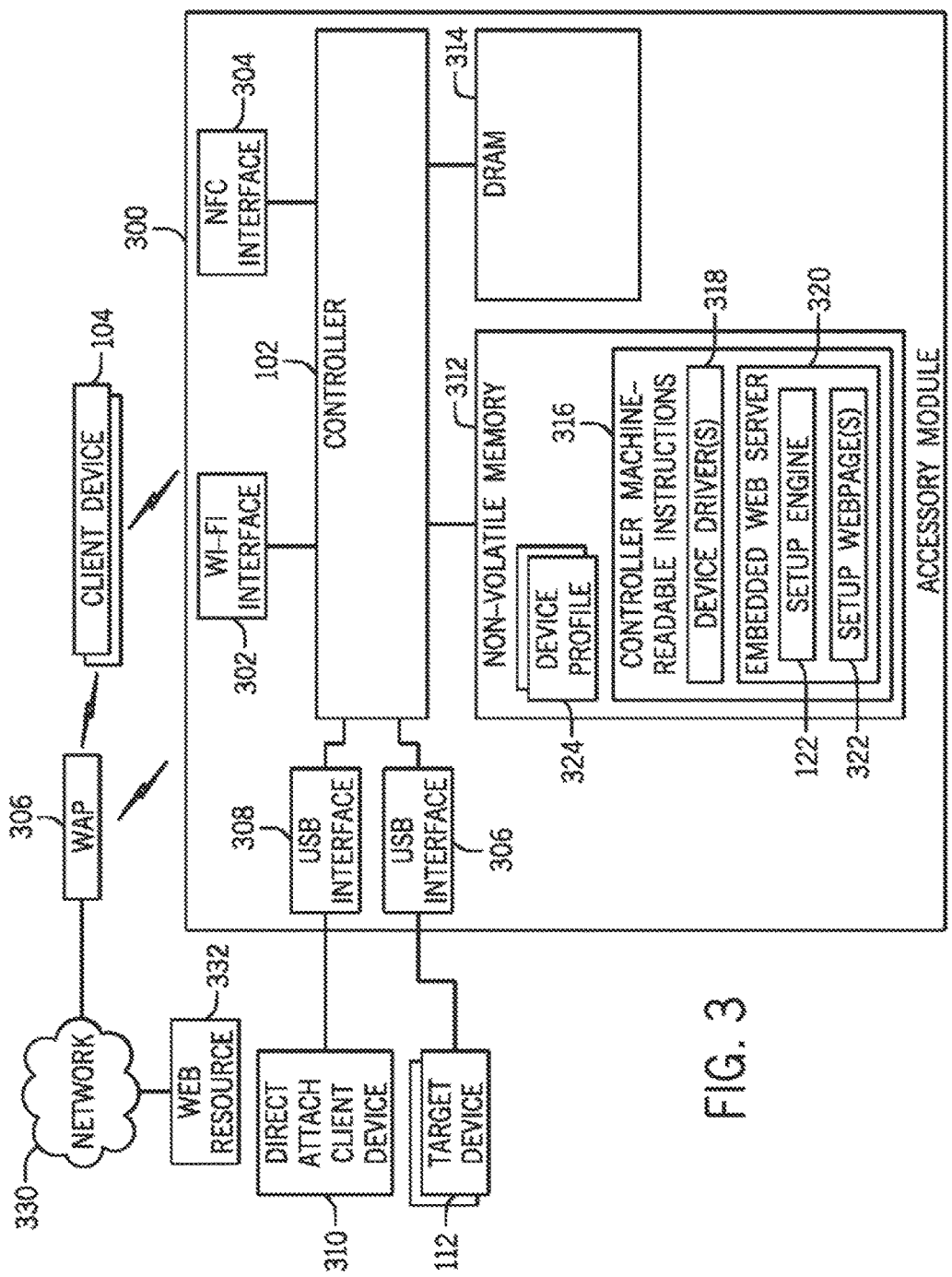

FIG. 3 is a block diagram of an example arrangement that includes an accessory module 300 according to further implementations. The accessory module 300 includes the controller 102, which can perform tasks discussed above in connection with FIG. 1. The accessory module 300 includes two wireless communication interfaces, including a WI-FI® interface 302 to perform WI-FI® wireless communications (according to IEEE 802.11), and a near-field communication (NFC) interface 304 that allows for wireless communication based on two devices (a client device and the accessory module 300) being touched to each other or brought within close proximity to each other. In other examples, other types of wireless communication interfaces can be provided in the accessory module 100.

The WI-FI® interface 302 allows the accessory module 300 to communicate with a wireless access point 306, which provides a wireless network (at least in part). A client device (e.g. client device 104) can communicate with the accessory module 300 using the wireless network provided by the wireless access point 306. Alternatively, a client device can perform peer-to-peer wireless communication with the accessory module 300 using the NFC interface 304.

The wireless access point 306 is coupled to a network 330, such as the Internet or other type of network. A web resource 332 (e.g. website or other web resource) is accessible over the network 330 through the wireless access point 306.

The accessory module 300 also includes a Universal Serial Bus (USB) interface 306, which can be connected to one or multiple target devices 112. The accessory module 300 also includes another USB interface 308, which can be used to connect to a direct attached client device 310. The direct attached client device 310 can be connected by a wired connection to the USB interface 308, to allow the direct attached client device 310 to access the accessory module 300 over the wired connection.

In other examples, instead of the USB interfaces 306 and 308, different types of wired communication interfaces can be employed.

The accessory module 300 also includes various storage media, including a non-volatile memory 312 and a dynamic random access memory (DRAM) 314 or other type of memory. The non-volatile memory 312 can be a flash memory or other type of persistent memory. The non-volatile memory 312 stores controller machine-readable instructions 316, which include one or multiple device drivers 318 for the target device(s) 112.

The controller machine-readable instructions 316 also include an embedded web server 320 that includes the setup engine 122 (as discussed above) and one or multiple setup webpages 322 that can be served by the embedded web server 320 of the accessory module 300 to a client device to configure accessory module 300 as described above in relation to accessory module 100 of FIG. 1. The embedded web server 320 can implement the captive portal discussed above.

FIG. 3 also shows that the non-volatile memory 312 stores one or multiple device profiles 324 (which can also be referred to as "personality profiles") for the respective target device(s) 112. Each device profile 324 contains information relating to a respective target device 112. Certain information in a device profile 324 can be provided to a client device to allow the client device to discover the respective target device connected to the accessory module 300. Such information can include a description or summary of the respective target device.

A device profile 324 can also include information that can be used to load a respective device driver 318 for the respective target device.

When a new target device is connected to the accessory module 300, the accessory module 300 can attempt to determine whether a device profile 324 for the new target device is stored in the non-volatile memory 312. If not, the accessory module 300 can access a remote system, such as a cloud system, to retrieve the respective device profile form the remote system. Once the device profile is retrieved and stored in the accessory module 300, the accessory module 300 is able to support the new target device 112.

Figure 4:
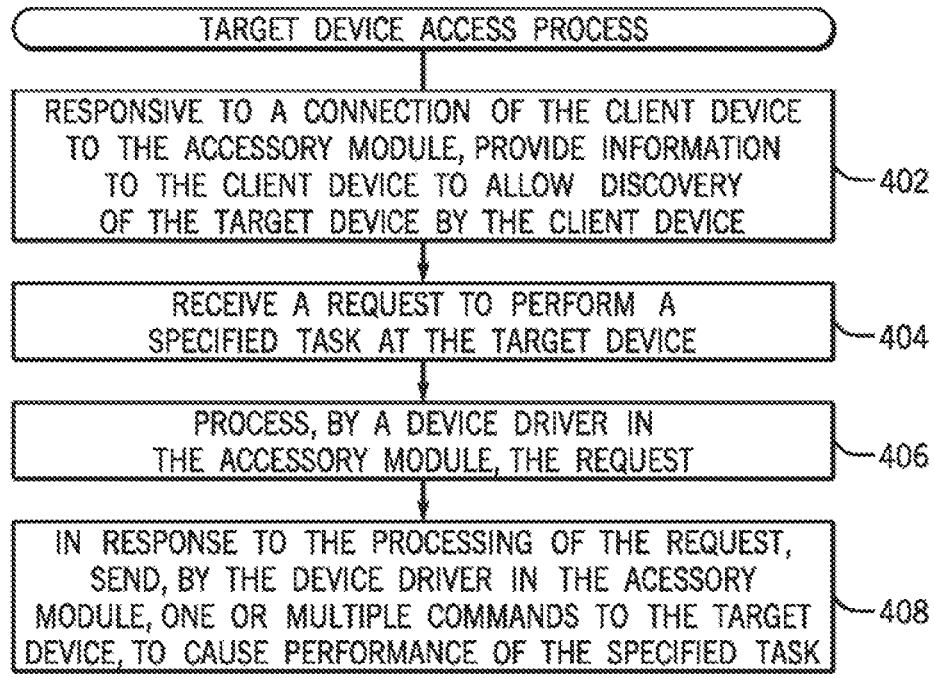
FIG. 4 is a flow diagram of an example process of accessing a target device using an accessory module according to some implementations.

FIG. 4 is a flow diagram of a process of accessing a target device using the accessory module 100 or 300, according to some implementations. The accessory module (e.g. 100 or 300) communicates using a first communication interface (e.g. wireless communication interface 106 of FIG. 1 or WI-FI® interface 302, NFC interface 304, or USB interface 308 of FIG. 3) with a client device. The accessory module 300 also communicates using a second communication interface (e.g. communication interface 110 of FIG. 1 or USB interface 306 of FIG. 3) with a target device 112.

Responsive to a connection of the client device to the accessory module, the accessory module provides (at 402) information (such as from a corresponding device profile 324) to the client device to allow discovery of a target device 112 by the client device. The information that can be provided to the client device can include information indicating presence of the target device 112 and describing capabilities and other aspects of the target device 112. Examples of such information include the manufacturer and model of the target device 112, a status or availability of the target device 112 (e.g. device available, busy, idle, in a power-save mode, etc.), an activity mode of the target device 112 (e.g. device heating or cooling, device printing, etc.), whether or not the target device 112 supports certain features such as duplex printing, stapling, color printing, or other features, a geographic location of the target device 112, and so forth.

Once the information to allow discovery of the target device 112 is provided to the client device, the client device can use such information to send a request to the accessory module to perform a specified task at the target device.

The request sent by the client device is received (at 404) by the accessory module. The received request is processed (at 406) by the accessory module. The processing of the request can be performed by the corresponding device driver in the accessory module. In response to the processing of the request, the device driver in the accessory module can send (at 408) an output (including one or multiple commands) to the target device, to cause performance of the specified task.

All of the features disclosed in this specification (including any accompanying claims, abstract and drawings), and/ or all of the steps of any method or process so disclosed, may be combined in any combination, except combinations where at least some of such features and/or steps are mutually exclusive.

Various different non-transitory machine-readable storage media are discussed above, including 116 in FIG. 1 and 312 and 314 in FIG. 3. As used herein, a "machine-readable storage medium" may be any electronic, magnetic, optical, or other physical storage apparatus to contain or store information such as executable instructions, data, and the like. For example, any machine-readable storage medium described herein may include any of various forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such, as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
   receiving, by an accessory module, a request for a first web resource from a first client device unable to communicate with a target device;
   in response to the request, redirecting, by the accessory module, the first client device to at least one setup webpage, different from the first web resource, for configuring the accessory module;
   receiving, from the first client device and in response to an input to the at least one setup webpage, configuration information for the accessory module;
   adjusting a setting of the accessory module using the configuration information, the adjusting of the setting comprising at least one selected from: selecting a language, selecting, at the accessory module, a setting to allow or disallow automatic update of machine-readable instructions at the accessory module, and a provision of a credential for accessing the accessory module;
   in response to requests from a plurality of client devices, performing, by the accessory module, respective tasks with respect to the target device using the adjusted setting of the accessory module;
   in response to a connection of the first client device through a communication interface to the accessory module, provide information to the first client device to allow discovery of the target device by the first client device;
   process a request from the first client device to perform a first task at the target device; and
   send an output to the target device in response to the request to cause performance of the first task.

2. The method of claim 1, further comprising receiving the request from the first client device using a wireless communication interface of the accessory module.

3. The method of claim 1, further comprising receiving the request of a second client device of the plurality of client devices over a wireless connection between the accessory module and the second client device.

4. The method of claim 3, wherein the wireless connection is one of: (1) a peer-to-peer wireless connection between the accessory module and the second client device, and (2) a wireless network provided by a wireless access point separate from the accessory module.

5. The method of claim 1, wherein the redirecting is performed using a captive portal that provides the at least one setup webpage.

6. The method of claim 1, wherein configuring the accessory module is in response to the input in the at least one setup webpage served by an embedded web server of the accessory module.

7. The method of claim 1, wherein the respective tasks with respect to the target device using the adjusted setting are performed by the accessory module without any further configuration of the accessory module for the requests of the plurality of client devices.

8. An article comprising at least one non-transitory machine-readable storage medium storing instructions that upon execution cause an accessory module to:
   receive, through a wireless communication interface of the accessory module, a request for a first web resource from a first client device, the first web resource at a network location remote from the accessory module and unable to communicate with a target device;
   in response to the request, redirect the first client device to at least one setup webpage served by an embedded web server of the accessory module, different from the first web resource, for configuring the accessory module;
   receive, from the first client device and in response to input to the at least one setup webpage, configuration information for the accessory module;
   adjust a setting of the accessory module using the configuration information, the adjusting of the setting comprising at least one selected from: selecting a language, selecting, at the accessory module, a setting to allow or disallow automatic update of machine-readable instructions at the accessory module, and a provision of a credential for accessing the accessory module;
   in response to requests from a plurality of client devices, perform respective tasks with respect to the target device using the adjusted setting of the accessory module;
   responsive to a connection of the first client device through the wireless communication interface to the accessory module, provide information to the first client device to allow discovery of the target device by the first client device;
   process a request from the first client device to perform a first task at the target device; and send an output to the target device in response to the request, to cause performance of the first task.

9. The article of claim 8, wherein the instructions upon execution cause the accessory module to further:
process, using a device driver for a target device, a request of a second client device to perform a task at the target device.

10. The article of claim 8, wherein the instructions upon execution cause the accessory module to further:
detect connection of a new target device to the accessory module;
retrieve a device profile for the new target device in response to detecting the connection of the new target device; and
use the device profile to support processing of requests for the new target device in response to requests from client devices.

11. The article of claim 10, wherein the instructions upon execution cause the accessory module to further:
send information in the device profile to a particular client device for discovery of the new target device by the particular client device.

12. The article of claim 8, wherein the respective tasks with respect to the target device using the adjusted setting are performed by the accessory module without any further configuration of the accessory module for the requests of the plurality of client devices.

13. An accessory module comprising:
a first communication interface to communicate wirelessly with a first client device unable to communicate with a target device;
a second communication interface to communicate with the target device, the accessory module being separate from the first client device and the target device; and
a controller to:
receive a request for a first web resource from a first client device;
in response to the request, redirect the first client device to at least one setup webpage, different from the first web resource, for configuring the accessory module;
receive, from the first client device and in response to an input to the at least one setup webpage, configuration information for the accessory module;
adjust a setting of the accessory module using the conformation information, the adjusting of the setting comprising at least one selected from: selecting a language, selecting, at the accessory module, a setting to allow or disallow automatic update of machine-readable instructions at the accessory module, and a provision of a credential for accessing the accessory module;
in response to requests from a plurality of client devices, perform respective tasks with respect to the target device using the adjusted setting of the accessory module;
responsive to a connection of the first client device through the first communication interface to the accessory module, provide information to the first client device to allow discovery of the target device by the first client device;
process a request from the first client device to perform a first task at the target device; and
send an output to the target device in response to the request, to cause performance of the first task.

14. The accessory module of claim 13, wherein the processing and the sending are performed by a device driver for the target device, the device driver being part of or executable by the controller.

15. The accessory module of claim 13, further comprising a storage medium to store device profiles for a plurality of different devices including the target device, wherein the information provided to the first client device includes information of one of the device profiles.

16. The accessory module of claim 13, wherein the respective tasks with respect to the target device using the adjusted setting are performed by the accessory module without any further configuration of the accessory module for the requests of the plurality of client devices.

* * * * *

UNITED STATES PATENT AND TRADEMARK OFFICE
CERTIFICATE OF CORRECTION

PATENT NO. : 10,248,363 B2
APPLICATION NO. : 15/118193
DATED : April 2, 2019
INVENTOR(S) : Kenneth K Smith et al.

Page 1 of 1

It is certified that error appears in the above-identified patent and that said Letters Patent is hereby corrected as shown below:

In Column 8, Line 7, Claim 1, delete "request" and insert -- request, --, therefor.

Signed and Sealed this
Tenth Day of December, 2019

Andrei Iancu
*Director of the United States Patent and Trademark Office*